UNITED STATES PATENT OFFICE.

ISAAC P. WENDELL, OF PHILADELPHIA, PENNSYLVANIA, ASSIGNOR TO CHARLES P. TASKER, OF SAME PLACE.

COMPOSITION OF MATTER FOR USE AS INSULATING MATERIAL.

SPECIFICATION forming part of Letters Patent No. 325,891, dated September 8, 1885.

Application filed February 14, 1885. (No specimens.)

*To all whom it may concern:*

Be it known that I, ISAAC P. WENDELL, a citizen of the United States, residing at Philadelphia, in the county of Philadelphia and State of Pennsylvania, have invented a new and useful Composition of Matter, of which the following is a specification.

The object of my invention is to provide an inexpensive compound having the proper characteristics for use as an insulating material.

My invention consists in a compound composed of asbestus or talc, litharge, antimony, and silicate of soda. The asbestus, having first been reduced to a condition of fiber or powder, or the talc to a condition of powder, is, with litharge and antimony in the form of powder, well mixed with liquid silicate of soda, molded into the desired form and dried by artificial or natural heat.

The proportions of the materials above named which I have found to produce a good article are, two pounds of asbestus or talc, one pound of litharge, one-half a pound of antimony, and three pounds of liquid silicate of soda, or a corresponding amount of crystallized silicate of soda, or a corresponding amount of other equivalent indurating material. These proportions may, however, be varied, and oxides or combinations of lead other than litharge may be employed, without departing from my invention.

Having thus described my invention, I claim—

A composition of matter consisting of asbestus, litharge, antimony, and silicate of soda, substantially as set forth.

In testimony whereof I have hereunto signed my name this 3d day of February, A. D. 1885.

ISAAC P. WENDELL.

In presence of—
WM. C. STRAWBRIDGE,
J. BONSALL TAYLOR.